(12) United States Patent
Caldow et al.

(10) Patent No.: US 11,422,080 B2
(45) Date of Patent: Aug. 23, 2022

(54) COMPOSITE WICKS FOR LOW NOISE PARTICLE COUNTING

(71) Applicant: TSI Incorporated, Shoreview, MN (US)

(72) Inventors: Robert Caldow, Roseville, MN (US); Sean Morell, Saint Paul, MN (US); Kenneth Farmer, Lake Elmo, MN (US); Sreenath Avula, Arden Hills, MN (US)

(73) Assignee: TSI Incorporated, Shoreview, MN (US)

( * ) Notice: Subject to any disclaimer, the term of this patent is extended or adjusted under 35 U.S.C. 154(b) by 753 days.

(21) Appl. No.: 16/346,064

(22) PCT Filed: Oct. 30, 2017

(86) PCT No.: PCT/US2017/059016
§ 371 (c)(1),
(2) Date: Apr. 29, 2019

(87) PCT Pub. No.: WO2018/081699
PCT Pub. Date: May 3, 2018

(65) Prior Publication Data
US 2020/0056974 A1 Feb. 20, 2020

Related U.S. Application Data

(60) Provisional application No. 62/415,333, filed on Oct. 31, 2016.

(51) Int. Cl.
*B01D 47/00* (2006.01)
*G01N 15/06* (2006.01)
(Continued)

(52) U.S. Cl.
CPC .............. *G01N 15/065* (2013.01); *B01D 5/00* (2013.01); *B01D 5/0027* (2013.01); *B05C 3/005* (2013.01);
(Continued)

(58) Field of Classification Search
CPC ......... G01N 15/065; G01N 2015/0038; G01N 2015/0046; G01N 15/02; B01D 5/00; B01D 5/0027; B05C 3/005; B05C 3/02
See application file for complete search history.

(56) References Cited

U.S. PATENT DOCUMENTS 5,872,622 A 2/1999 Schildmeyer et al.
5,903,338 A 5/1999 Mavliev et al.
(Continued)

FOREIGN PATENT DOCUMENTS

| CN | 1772340 | 5/2006 |
|---|---|---|
| CN | 103987445 | 8/2014 |

(Continued)

OTHER PUBLICATIONS

"Singapore Application Serial No. 11201903900Y, Office Action dated Jun. 9, 2020", 39 pages.
(Continued)

*Primary Examiner* — Dung H Bui
(74) *Attorney, Agent, or Firm* — Schwegman Lundberg & Woessner, P.A.

(57) ABSTRACT

Various embodiments include composite wicks for ultra-low noise condensation particle counters (CPCs). In one embodiment, a composite wick includes a first porous material having a first pore density, with the first porous material further having a first surface and an opposing second surface. A second porous material is in fluid communication with the first porous material and has a first surface with an area substantially the same as an area of the first surface of (Continued)

the first porous material. The first surface of the second porous material is substantially in contact with the first surface of the first porous material. The second porous material has a pore density that is dissimilar the first pore density of the first material. The first material and the second material are configured to provide vapor from a liquid to a fluid-based particle counter. Other apparatuses are disclosed.

27 Claims, 3 Drawing Sheets

(51) Int. Cl.
  B01D 5/00 (2006.01)
  G01N 15/00 (2006.01)
  G01N 15/02 (2006.01)
  B05C 3/00 (2006.01)
  B05C 3/02 (2006.01)
(52) U.S. Cl.
  CPC ............... *B05C 3/02* (2013.01); *G01N 15/02* (2013.01); *G01N 2015/0038* (2013.01); *G01N 2015/0046* (2013.01)

(56) References Cited

U.S. PATENT DOCUMENTS

| | | | | |
|---|---|---|---|---|
| 2004/0237962 | A1* | 12/2004 | Russell | G02C 11/00 128/201.15 |
| 2005/0208243 | A1* | 9/2005 | Chambers | B32B 7/12 428/36.1 |
| 2007/0020172 | A1* | 1/2007 | Withers-Kirby | C01B 3/065 423/648.1 |
| 2007/0187072 | A1* | 8/2007 | Chin | F28D 15/0266 165/104.21 |
| 2008/0137065 | A1* | 6/2008 | Oberreit | G01N 30/84 356/37 |
| 2008/0144003 | A1* | 6/2008 | Blackford | G01F 3/00 356/37 |
| 2011/0056273 | A1 | 3/2011 | Gorbunov et al. | |
| 2011/0095095 | A1* | 4/2011 | Hering | G01N 1/2202 239/589 |
| 2014/0033915 | A1* | 2/2014 | Hering | B01D 47/00 95/1 |
| 2015/0001601 | A1 | 6/2015 | Caldow et al. | |
| 2015/0268140 | A1* | 9/2015 | Wang | G01N 15/0227 356/335 |
| 2015/0320116 | A1* | 11/2015 | Bleloch | A24F 40/465 219/628 |
| 2016/0319653 | A1* | 11/2016 | Reeves | E21B 43/121 |
| 2018/0045636 | A1* | 2/2018 | Avula | G01N 15/065 |
| 2019/0339186 | A1* | 11/2019 | Remiarz | G01N 15/065 |
| 2020/0271562 | A1* | 8/2020 | Berger | G01N 15/065 |

FOREIGN PATENT DOCUMENTS

| | | |
|---|---|---|
| CN | 104833620 | 8/2015 |
| CN | 110036275 | 7/2019 |
| GB | 2406796 A * | 4/2005 ........... A61F 13/141 |
| JP | 2014504732 | 2/2014 |
| JP | 2019533169 | 11/2019 |
| WO | WO-2013055525 A1 | 4/2013 |
| WO | 2016137962 | 9/2016 |
| WO | WO-2018081699 A1 | 5/2018 |

OTHER PUBLICATIONS

"Singapore Application Serial No. 11201903900Y, Response filed Oct. 18, 2020 to Office Action dated Jun. 9, 2020", 12 pages.
"European Application Serial No. 17865256.6, Response filed Dec. 11, 2020 to Extended European Search Report dated May 15, 2020", 17 pages.
"Japanese Application Serial No. 2019-523861, Notification of Reasons for Refusal dated Nov. 2, 2021", with English translation, 7 pages.
"Chinese Application Serial No. 201780074569.4, Response filed Nov. 5, 2021 to Office Action dated Jul. 5, 2021", with English claims, 17 pages.
"Chinese Application Serial No. 201780074569.4, Office Action dated Jan. 10, 2022", with machine English translation, 14 pages.
"European Application Serial No. 17865256.6, Extended European Search Report dated May 15, 2020", 10 pages.
"European Application Serial No. 17865256.6 Response to Communication pursuant to Rules 161(2) and 162 EPC filed Dec. 30, 2019", 9 pages.
"International Application Serial No. PCT/US2017/059016, International Search Report dated Jan. 29, 2018", 4 pgs.
"International Application Serial No. PCT/US2017/059016, Written Opinion dated Jan. 29, 2018", 8 pgs.
"Chinese Application Serial No. 201780074569.4, Office Action dated Jul. 5, 2021", with machine English translation, 19 pages.
Banse, D F, "Particle counting efficiency of the TSI CPC 3762 for different operating parameters", Journal of Aerosol Science vol. 32 No. 1, (Dec. 31, 2001), 5 pages.
Cao, Yunhua, "Theoretical Model and Experimental Research of Stainless Steel Wire Filter Applied to Diesel Engine Particles", China's Excellent Doctoral and Master's Degree Theory Full-text database (doctoral) work application Cheng Technology Series II Issue 2, (Jun. 15, 2005), 168 pages.
"International Application Serial No. PCT US2017 059016, International Preliminary Report on Patentability dated May 9, 2019", 10 pages.
"Korean Application Serial No. 10-2019-7015762, Notice of Preliminary Rejection dated Feb. 23, 2022", with English translation, 11 pages.
"Chinese Application Serial No. 201780074569.4, Response Filed Mar. 21, 2022 to Office Action dated Jan. 10, 2022", with English claims, 15 pages.
"Japanese Application Serial No. 2019-523861, Response Filed Apr. 1, 2022 to Notification of Reasons for Refusal dated Nov. 2, 2021", with English claims 11 pages.
"Chinese Application Serial No. 201780074569.4, Decision of Rejection dated Jun. 2, 2022", With English Translation, 21 pgs.

* cited by examiner

COMPOSITE WICKS FOR LOW NOISE PARTICLE COUNTING

CLAIM OF PRIORITY

This patent application is a U.S. national stage application filed under 35 U.S.C. § 371 from International Application Serial No. PCT/US2017/059016, filed on 30 Oct. 2017, and published as WO 2018/053165 on 3 May 2018, which claims the benefit of priority to U.S. Provisional Application Ser. No. 62/415,333, filed 31 Oct. 2016, and entitled, "Composite Wicks for Low Noise Particle Counting," the disclosures of which are incorporated by reference herein in their entireties.

TECHNICAL FIELD

This application relates to the technical field of airborne particle counters, and, in specific embodiments, to apparatuses to reduce false-particle counts in condensation particle counters.

BACKGROUND

In a number of airborne particle measurement studies, a condensation particle counter (CPC, also known as a condensation nucleus counter, CNC) is used to detect particles in a monitored environment; the particles being too small to scatter enough light to be detected by conventional detection techniques (e.g., light scattering of a laser beam in an optical particle counter). The small particles are grown to a larger size by condensation, from a working fluid within the CPC, being formed on the particle. That is, each particle serves as a nucleation point for the working fluid; a vapor is condensed onto the particles to make them larger. After achieving growth of the particle due to condensation of the working fluid vapor onto the particle, CPCs function similarly to optical particle counters in that the individual droplets then pass through the focal point (or line) of a laser beam, producing a flash of light in the form of scattered light. Each light flash is counted as one particle.

Despite their advantages in detecting extremely small particles, CPCs are known for producing high false-count rates. As volumetric sample flow-rates (i.e., sampling rates) increase, any working fluid that drains in to the flow path has a tendency to create bubbles or other forms of small droplet. The small droplets then grow into large particles that are detected by an optical particle detector within the CPC. Since these counts are generated internally to the CPC and are not caused by actual particles from a monitored environment, the internally-generated counts are considered false-particle counts and occur even when the particle counter is sampling generally clean, particle-free HEPA-filtered air (e.g., such as filtered air received from a High Efficiency Particulate Air (HEPA) filter).

In some applications, the false-count rates produced by CPCs may typically be more prevalent in water-based CPCs, as compared with CPCs based on other types of working fluids (e.g., alcohol-based CPCs using, for example, isopropanol or butanol). Since CPCs have typically been used to measure higher concentrations of particles, a high false-count rate has not been an issue in most applications. However, the high false-count rate is a significant problem for measuring low particle concentrations as found in, for example cleanrooms and environments in which electronics manufacturing processes occur. The high false-count rate becomes even more critical with an increased sample flow rate as found in a cleanroom CPC, which is typically 2.83 liter per minute (approximately 0.1 ft$^3$ per minute). The performance of a CPC is rated by the number of false counts over a specified time period. For example, a semiconductor cleanroom may require less than six false counts per hour at this flow rate.

Previous attempts by various manufacturers to develop a high flow-rate CPC with a low false-count rate for use in cleanroom applications have been unsuccessful. While some approaches yield good false-count rates initially, these approaches have been unable to sustain low false-count rates for significant lengths of time.

Consequently, in general, the lower the number of false counts, the better the instrument. The disclosed subject matter describes techniques and designs to reduce or eliminate false-particle counts in a CPC.

DETAILED DESCRIPTION

The science of condensation particle counters, and the complexity of the instrumentation, lies with the technique to condense vapor onto the particles. When the vapor surrounding the particles reaches a specific degree of supersaturation, the vapor begins to condense on the particles. The magnitude of supersaturation determines the minimum detectable particle size of the CPC. Generally, the supersaturation profile within the instrument is tightly controlled.

While there are several methods that can be used to create condensational growth, a widely used technique is a continuous, laminar flow method. Continuous flow laminar CPCs have more precise temperature control than other types of CPCs, and they have fewer particle losses than instruments that use turbulent (mixing) flow. In a laminar flow CPC, a sample is drawn continuously through a conditioner region which is saturated with vapor and the sample is brought to thermal equilibrium. Next, the sample is pulled into a region where condensation occurs. In contrast, in an alcohol-based (e.g., isopropanol or butanol) CPC, the conditioner region is at a warm temperature, and the condensation region (saturator) is relatively cooler. Water has very high vapor-diffusivity, so a laminar flow, water-based CPC with a cool condensation region does not work thermodynamically. In a laminar flow water-based CPC, the conditioner region is cool, and the condensation region is relatively warmer.

Water-based CPCs have several advantages over alcohol-based CPCs. Water s non-toxic environmentally friendly, and easy to procure. Water however, also has a few disadvantages. In general, the liquid purity is not as tightly controlled for water as for alcohols purchased from chemical supply houses. The impurities in the water may build up in the wick, used to supply working fluid to the particle-laden sample stream, and eventually cause the wick material to become ineffective. To counteract this impurity effect, distilled or high-purity water is frequently utilized. Additionally, the wicks are often field replaceable by an end-user. In some environments where extremely low particle counts are expected to be present (e.g., a semiconductor-fabrication facility), the end-user may use water specifically prepared and packaged for use in normal-phase liquid chromatography (NPLC). NPLC water is ultra-pure water with a low ultra-violet (UV) absorbance often filtered through, for example, a 0.2 micrometer (µm) filter, and packaged in solvent-rinsed amber glass bottles and sealed under an inert atmosphere such as nitrogen. The use of NPLC water can help to reduce or eliminate false-particle counts from contaminants (e.g., ions, particles, or bacteria) that may ordinarily be present in the water.

As noted above, reported count rates in contemporaneous water-based condensation particle counters (CPCs) are generally not acceptable for cleanroom applications due to the high false-particle count rate. Current cleanroom requirements (e.g., in the semiconductor industry) specify a stringent false-count rate of less than six counts per hour at an air sampling flow rate of 2.83 liters per minute. Typical CPCs have false counts that are orders of magnitude higher than this and these tend to include sporadic "bursts" of counts over time. This false-count "noise" can be indistinguishable from real particle counts in an environment under test. Various embodiments of the inventive subject matter described herein solve a persistent problem in CPCs that have to control the flow of air/aerosol through a growth chamber while also managing condensing working fluid on all internal surfaces of the chamber so that the condensed liquid does not bead, form droplets, and create noise particles. In addition, the CPC has to have a flow of fresh liquid into the system that must be dispersed without creating noise particles. Typically the wick is used for this purpose.

Various embodiments disclosed herein include techniques and designs that were developed specifically to reduce or eliminate false counts caused by various factors, such as, for example, water bubbles or empty water droplets (e.g., detected "particles" not containing an actual particle serving as a nucleation point). In one example, a combination of materials for a composite wick provides liquid management, long life, and an evaporation surface that allows measured particles to grow as intended without adding "noise particles" (i.e., particle events that are generated internally by the CPC and therefore are not indicative of actual particle events in the monitored environment).

In one embodiment, the cleanroom CPC disclosed herein uses at least two "layers" of porous media to form a wick. Each "layer" may have some overlapping portions and be either substantially uniform or varying in thickness. In embodiments, a thickness of the layer is considered substantially uniform within a thickness variation of about 0% to about 10%. In embodiments, a thickness of the layer is considered substantially uniform within a thickness variation of about 10% to about 20%. Further, each layer may comprise the same material or different materials. Also, as noted in more detail below, each layer may have uniform or varying pore (e.g., opening) sizes and uniform or varying pore densities. The pores may comprise one or more shapes of openings within each material such as round, elongated, openings varying in cross-section (both in area and in shape), openings between adjacent fibers, and various combinations thereof or a number of other shapes and constant or varying sizes as would be understandable to a skilled artisan. Further, the various openings may be formed by, for example, mechanical and/or chemical means or other processes known independently to the skilled artisan.

The porous media is used to draw the working fluid to an area surrounding an incoming particle-laden aerosol sample flow path. The porous media, also referred to as a wick, may comprise one or more various types of material as noted. In the inventive subject matter disclosed herein, the various types of material may be either hydrophilic or hydrophobic. In a specific embodiment, both a hydrophilic material and a hydrophobic material are used to form the composite wick. In yet another embodiment, both materials used are hydrophobic. In yet another embodiment, both materials are hydrophilic. The porous media surrounds at least a portion of the aerosol flow path and may comprise a continuous material from a sample inlet of the CPC to at or near an optical particle detector used to detect the particles once they have grown in size due to formation of condensed working fluid surrounding the particle. In various embodiments, the composite wick is removable from the CPC for transport and maintenance of the CPC. In contrast to the inventive subject matter, conventional wicks consist of porous material such as molded/sintered polyethylene, blotter paper, etc. These wicks are kept moist using an inflow of working fluid, such as water. These single-material wicks have issues with false counts from in-rushing fluid, entrapped air bubbles bursting, and fluid condensing on surfaces that forms droplets that periodically fall, splash, or are incompletely absorbed back into the wick.

To solve these additional problems, embodiments of the present invention disclose an improved wick design for use in high-flow water CPCs that produces consistently ultra-low noise counts (that can be less than 0.02 counts per minute at 2.83 lpm—well below the six counts per hour requirement for semiconductor cleanrooms) over a long period of time (greater than 30 days). The inventive subject matter employs, in one embodiment, a two-material wick design that performs better than all other wicks alone. In another embodiment, a single wick material may be modified to create a composition structure to reduce false-particle counts. For example, machining an inner surface of a wick at, for example, an appropriate high speed or treating it chemically may make the inner surface have smaller pores, similar to a lined wick discussed herein.

Although the description that follows focuses primarily on a combination of the Nytran™ material composited with a sintered plastic layer, the inventive subject matter can be readily used with other combinations of materials as well. For example, sintered metals or ceramics, or other materials formed with about sub-micron sizes of pores may be used in forming a composite wick as well. Further, although the description that follows describes a composite wick comprising two-materials, the skilled artisan upon reading and understanding the description provided herein, will recognize that more than two layers of material may be utilized. One or more of the composite materials may include a hydrophilic material to aid in drawing the working fluid into the saturation zone of a CPC. Therefore, for ease in understanding the inventive subject matter, the remainder of the description will focus on the use of two materials—Nytran™ and sintered plastic.

Initially, variations of wicks were tested with a plastic wick lined with several lengths of Nytran™ with results that the counts were not significantly improved. In various embodiments, the Nytran™ layer was extended onto other surfaces to collect condensate and prevent droplets forming. The design was subsequently built and tested in a total of five units with two variations of how far the Nytran™ lining projected above the top of the plastic wick, as shown and described with reference to FIG. 1, below. The composite design allows a wicking layer to protrude into irregular spaces where fluid condenses preventing the buildup of problematic water droplets. In testing, a composite wick consisting of molded sintered plastic with a Nytran™ liner had the best overall performance of any wick as well as having the advantages of reasonable cost currently, Nytran™ is approximately 50 times more expensive than a typical plastic wick). In embodiments, the Nytran™ layer projects up into the cone-shaped area at the top of the space to provide a smooth transition from a non-porous surface, upon which condensation occurs, to the wick material. This transition prevents large droplets from collecting on a material boundary and growing until they drip and cause, for example, bursts of particles.

The composite wick consists of a layer of porous, sintered plastic that allows water to flow freely throughout the wick from an injection source and to flow uniformly throughout by capillary action, while keeping the internal Nytran™' wick wet and allowing water (or other working fluid) vapor to enter the air flow. The Nytran™ prevents particles from bubbles or irregularities in wetting in the plastic wick being a problem. The thin layer of Nytran™ is flexible enough to be extended to surfaces above the plastic wick where condensation can occur and allows the water to flow back into the wick without forming large water droplets that lead to false counts. The Nytran™ layer also helps to draw the condensed working fluid (e.g., water) into the wick tube. Additionally, the sintered plastic in combination with the Nytran™ material provides an aid in keeping the false count reduced or minimized as a function of time, as well as forming the composite wick, as discussed below. These and other advantages of the composite wick are described in more detail, below.

In the following detailed description, reference is made to the accompanying drawings that form a part of the false-particle reduction techniques and in which is shown, by way of illustration, specific embodiments. Other embodiments may be utilized and, for example various thermodynamic, mechanical, or physical changes may be made without departing from the scope of the present disclosure. The following detailed description, therefore, is to be taken in an illustrative sense rather than in a limiting sense.

Figure 1:
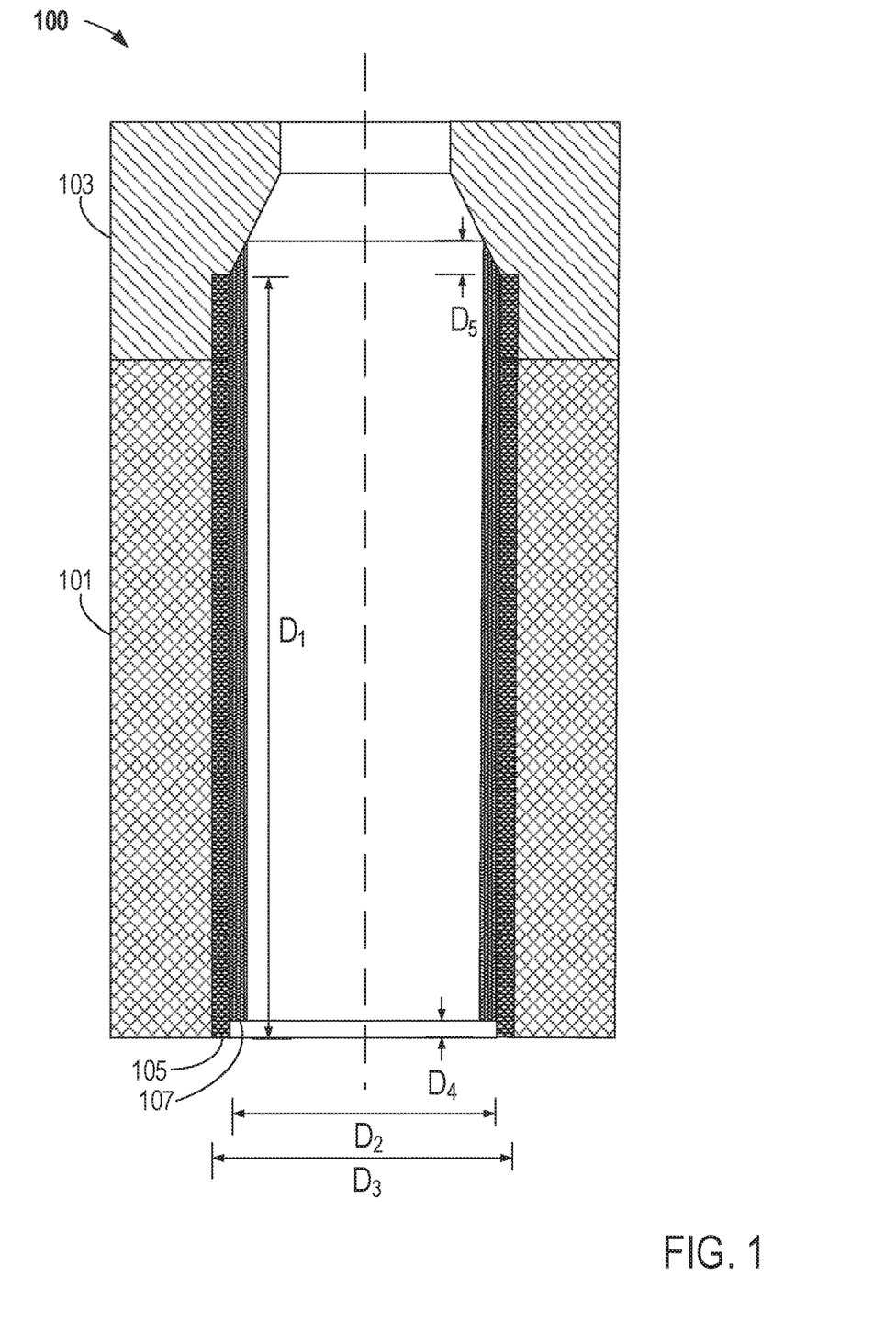
FIG. 1 shows a cross section of a composite wick inserted into a wick holder, according to various embodiments.

With reference now to FIG. 1, a cross section 100 of a composite wick inserted into a wick holder is shown. The wick holder is shown to include a tubular section 101 and a conical section 103. As shown, the tubular section 101 has a drilled, molded, or otherwise formed hole along its long axis. The inner surface of the tubular section 101 can allow some excess amount of the working fluid to return to reservoir. The tubular section 101 can be formed from a variety of materials including aluminum, brass, stainless steel, ceramic, and various types of plastic and other materials that are impervious to the working fluid. Although not shown the tubular section 101 can be formed to have a round, oval, elongated rectangle or other cross-sectional shape (as viewed along the longitudinal axis of the tubular section 101).

The conical section 103 can be formed from the same or similar materials as the tubular section 101. The inner surface of the conical section 103 is generally formed to have a slight surface texture that prevents water from beading on the surface, but rather spreads it across a wetted surface so that it can return to the wick without forming a large droplet that may drip or splash. In one specific embodiment, the conical section 103 is formed from a thermally-insulating material, such as an acetyl-homopolymer resin. One acetyl-homopolymer material that can be utilized as a material from which to form the conical section 103 may be, for example, Delrin®, available from E.I. du Pont de Nemours and Company (DuPont™), 1007 North Market Street, Wilmington Del., United States. An insulating material is selected to provide a thermal barrier between the cold, tubular section 101 and the optics above (not shown but understood by a skilled artisan). The thermally-insulative material prevents or minimizes condensation of water in the path to the optics. Further, the conical section 103 is provided to direct the flow into a smaller tube section in preparation for directing the flow through a small diameter nozzle that is aligned with a laser beam in the optics. The laser beam provides a flash of light for each droplet that passes through the laser beam. This flash is generally detected by a photo detector that converts the light signal into an electrical pulse.

The composite wick is formed within the hole of the tubular section 101. In embodiments, two or more "layers" of a single material may form a composite wick. In a specific embodiment, the composite wick may be formed from two or more dissimilar materials. As shown in FIG. 1, the composite wick is formed from a first porous material 105 (e.g., a sintered plastic material) and a second porous material 107 (e.g., a liner material). The materials are porous so as to allow the working fluid (e.g., water or alcohol) to pass (both axially and longitudinally) throughout the material. Each of the first porous material 105 and the second porous material 107 may have dissimilar (e.g., different) pore densities and pore-size distributions from each other as discussed above. Moreover, wicking materials can include a uniform distribution of pore densities and size distributions, a narrow distribution of pore densities and size distributions, a wide distribution of densities and size distributions, or various combinations thereof. The pores may also comprise, for example, fibers or fibrous materials, both woven or non-woven materials, various sponge-like materials fabrics, glass-fibers, or various combinations thereof.

In various embodiments, a smaller pore size allows the working fluid to be wicked to a greater height than would be possible with a larger pore size. The pores may have dimensions (e.g., a diameter or other characteristic dimension) having micron or sub-micron dimensions. In a specific embodiment, the mean pore size may be about 0.45 μm in diameter (or other characteristic dimension) in the Nytran™ material and about 50 μm in diameter in the sintered plastic material. In other embodiments, the liner mean pore size may be up to about 1 μm in diameter or more. In still other embodiments, the liner mean pore diameter may be approximately 0.2 μm or smaller. In these same embodiments, the sintered plastic mean pore diameter or other characteristic dimension range may be in the range from about or below 25 μm in diameter to about or above 100 μm in diameter. In still other embodiments, the pore diameters or other characteristic dimension ranges may include many or all of the sizes discussed above. The pore size of the porous plastic wicks typically tested is nominally 50 μm. However, pore sizes of nominally 25 μm and 75 μm have also been found to work well.

Figure 2A:
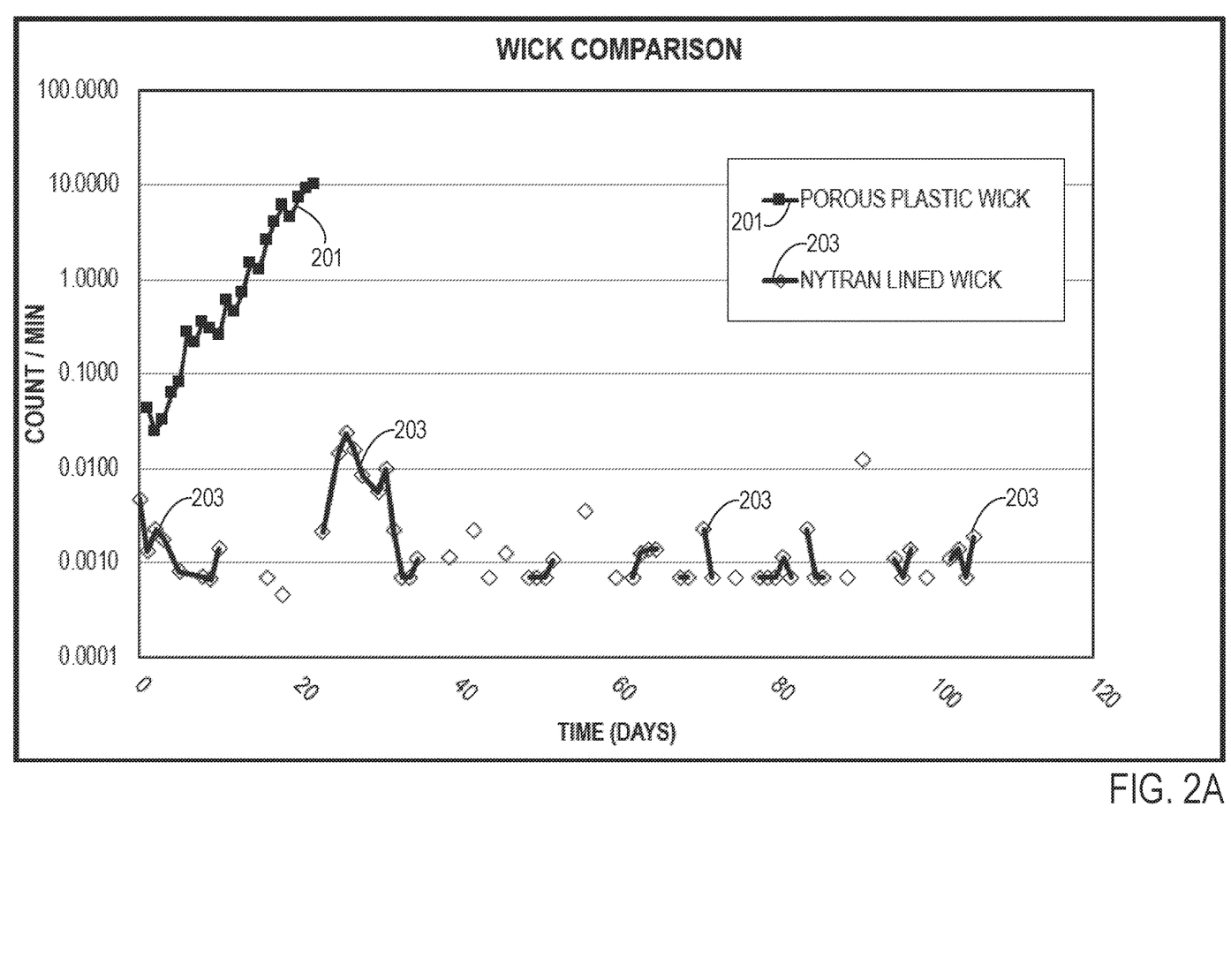
FIG. 2A is a semi-logarithmic graph comparing a single porous plastic wick to a composite porous-plastic wick with an inner nylon-membrane wick.

In a specific embodiment, an overall length, $D_1$, of the first porous material 105 is about 240 mm (approximately 9.5 inches) and has a thickness of approximately 1 mm to 2 mm (approximately 0.040 inches to 0.080 inches). Assuming the tubular section into which the first porous material 105 is inserted has a round cross-section, an outer diameter, $D_3$, of the first porous material 105 is about 12 mm (approximately ½ inch) and an inner diameter, $D_2$, is about 10 mm (approximately ⅜ inch). The second porous material 107 is formed to extend into the conical section 103 a distance, $D_5$, of about 2.5 mm (approximately 0.1 inches), at least partially depending on an angle formed on the interior portion of the cone. The second porous material 107 is formed on the bottom edge to be a distance, $D_4$, above the first porous material 105 about 1 mm (approximately 0.040 inches). The distance, $D_4$, is at least partially based on the extension of the second porous material 107, if any, into the conical section 103. As shown in FIG. 1, the second porous material 107 projects into the cone and makes firm contact with the surface of the cone to enable condensed liquid from the surface of the cone to be absorbed into the material without beading on small gaps in the transition surfaces. In other embodiments, the projection is not necessary. For example, based on a physical geometry of a particular tube and cone (if used), the projection may not be needed. The second porous material 107 may have a thickness of approximately 50 μm to 100 μm (approximately 0.002 inches to 0.004 inches). The first porous material 105 and the second porous material 107 may have surface areas that are substantially the same or similar (e.g., having surface areas within a range of 10% to 20%). However, each of these dimensions and other quantities is provided to more clearly illustrate a specific embodiment, as well as the general nature of the inventive subject matter. Regardless, based on reading and understanding the disclosure provided herein, a person of ordinary skill in the art will recognize that other dimensions may readily be determined based on aerosol flow rates working fluid transport characteristics of the chosen wick material, thermodynamics of the system, and other considerations for a particular CPC.

In various embodiments, and as described in more detail below, the first porous material 105 has a large pore size and the second porous material 107 is a denser material (i.e., having a smaller pore size). The large pore size allows working fluids to move more freely and distribute more evenly than the small pore sizes in the dense material, while the dense inner material reduces air bubbles and suppresses pressure fluctuation due to events such as fill valve movement and other factors. Having a separate material layer also buffers the effect of incoming water injection caused by, for example, physically moving the CPC, to contain pulsations and containing any droplets that would cause particles and noise.

In some embodiments, either one or both of the first porous material 105 and the second porous material 107 may be manufactured to include a surfactant. The surfactant acts to lower the surface tension between the working fluid and the porous material. In certain applications however, and depending upon a chemical composition of the surfactant, the surfactant may shed or otherwise be dislocated from the porous material. In such cases, the surfactant may be chemically removed, stripped, washed or otherwise eliminated or reduced by means known independently to a skilled artisan. Based on the various embodiments discussed herein, and as discussed in more detail below, the false particle count rates with a typical wick have been reduced several orders of magnitude by using the composite wick described herein. For example, in tests conducted employing the composite wick, false-particle counts have remained at or very close to zero for 30 days or more.

In one embodiment, one or both of the first porous material 105 and the second porous material 107 may comprise a sintered plastic. In other embodiments, one or both of the porous materials may comprise blotter paper or similar porous materials. In still other embodiments, and as discussed in more detail below, the porous materials may include, for example sintered metals and sintered ceramics.

One suitable porous material used as, for example, the second porous material 107, is a nylon membrane referred to under the trade name of Nytran™ (available from Sigma-Aldrich, with corporate offices at 3050 Spruce Street, St. Louis, Mo., or from GE Healthcare Life Sciences, with corporate offices at 100 Results Way, Marlborough, Mass., both located in the United States of America). Nytran™ is a porous material, having a median pore size dimension of about 0.45 μm. In other forms, Nytran™ has a median pore size dimension of about 0.2 μm. Nytran™ is a nylon membrane cast substantially uniformly on both sides of a support matrix, thereby exhibiting symmetry from a first surface (e.g., face) of the material to a second, opposing surface along with a substantially consistent membrane morphology. Nytran™ has a binding capacity of greater than 600 $\mu g/cm^2$.

The second porous material 107, such as Nytran™, provides a barrier to an origin of false counts for a variety of reasons. For example, bubbles (e.g., comprised of air surrounded by water or other working fluid) are unable to traverse the Nytran™ due to the small pore sizes formed during manufacture of the Nytran™ material.

However, when the second porous material is chosen to be Nytran™ as used in the specific embodiment described above, other mechanical characteristics may need to be considered. For example, Nytran™ swells when wetted, thereby increasing the difficulty level in removal of the wick (followed by a subsequent replacement with a new wick), especially when such replacement operations are performed in the field (unless the material is given sufficient time to dry completely prior to wick replacement). Consequently, by compositing the Nytran™ with another material, such as the sintered plastic, the effects from the swelling can be reduced or eliminated as compared with the use of the Nytran™ material by itself. Further, Nytran™ is more difficult to form into a given shape. Therefore, the first porous material 105 can be selected from a material that is readily easy to form (e.g., such as sintered plastic or sintered metal), especially when the first porous material 105 is formed around the Nytran™ material.

As described above in some embodiments, the composite wick (consisting of the first porous material 105 and the second porous material 107) is formed such that each material is substantially in a single layer (e.g., rolled) with a slight overlap on the meeting edges. The composite wick is then press-fit within the hole. In other embodiments, the composite wick is held in place by a chemical adhesive, in either a few places or as a continuous layer of adhesive. However, chemical adhesives may deteriorate after a passage of time. In still other embodiments, the composite wick may be held in place by mechanical means (other than the press-fit) known independently to a skilled artisan.

With reference now to FIG. 2A, a semi-logarithmic graph is shown comparing a single porous plastic wick to a composite porous-plastic wick with an inner nylon-membrane wick (in this embodiment, Nytran™ was selected for the inner wick). The inlet to the water-based CPCs under test were connected to an absolute filer (e.g., a HEPA or ULPA filter, known in the art) such that any "particles" detected by each CPC were generated internally. Therefore, all counts shown are indicative of false counts. The abscissa indicates the time, in days, over which the test was run. The ordinate scale indicates the logarithmic count per minute of particles as a function of time. The first curve 201 indicates a continually-increasing count per minute of a single material wick utilizing only a porous plastic. As noted in FIG. 2A, the particle count from the porous plastic wick continues to increase for the first 20 days, at which point the test for the CPC containing the porous plastic wick was discontinued.

Figure 2B:
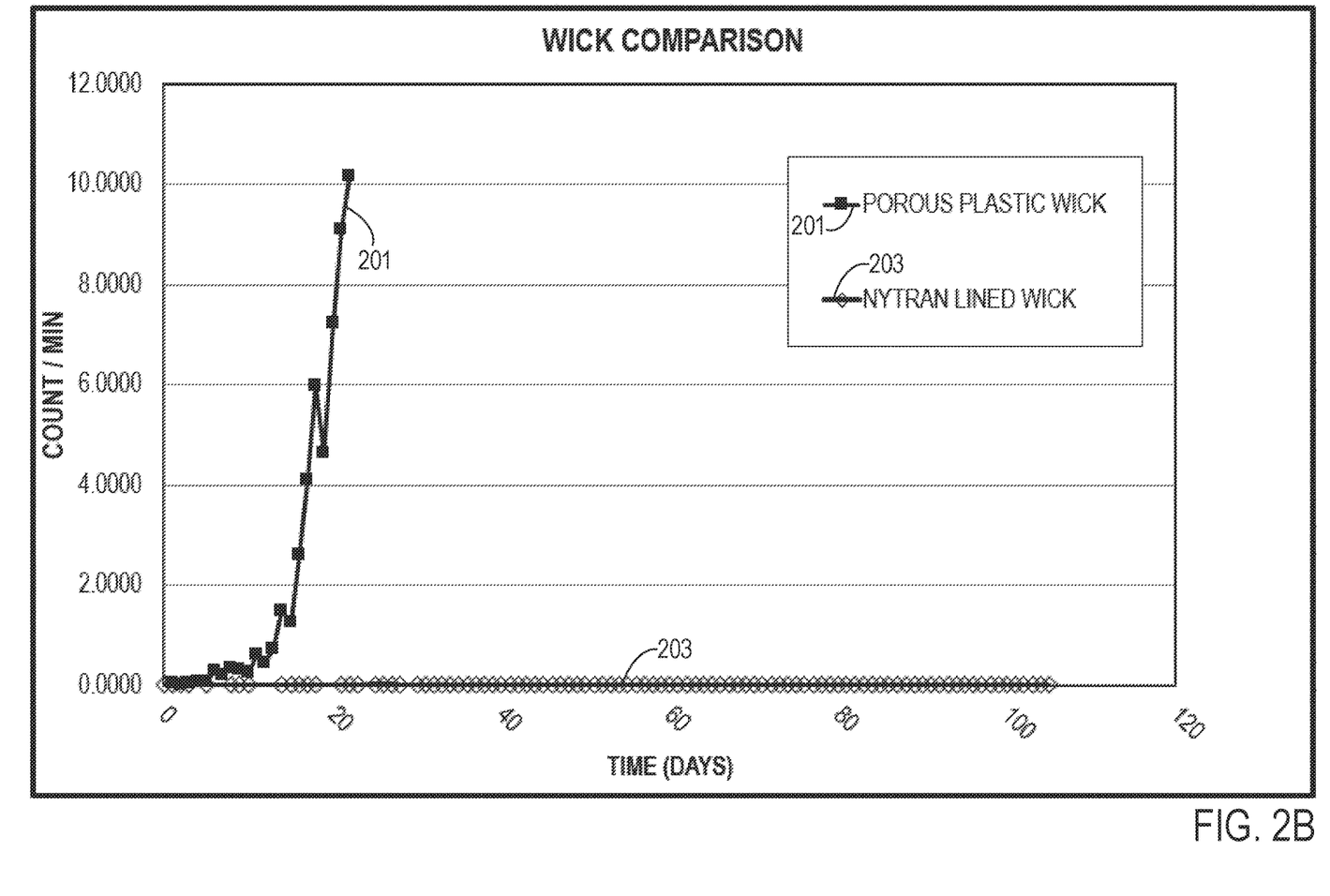
FIG. 2B is a two-dimensional linear version of the semi-logarithmic graph of FIG. 2A, comparing a single porous-plastic wick to a composite porous plastic wick with an inner nylon-membrane wick.

However, as noted by the second curve 203, and recalling that the ordinate axis is shown logarithmically, the composite porous-plastic wick with an inner nylon-membrane wick shows a total maximum count rate (i.e., false-count rate) of approximately 0.03 counts per minute (i.e., less than 2 counts per hour). The near-zero false count rate can be seen more readily with reference to FIG. 2B, which is a two-dimensional linear version of the semi-logarithmic graph of FIG. 2A, and also compares a single porous-plastic wick to a composite porous plastic wick with an inner nylon-membrane wick.

In yet another series of tests, an embodiment of the composite wick described herein was utilized for testing conducted with working fluids other than water. The tests confirmed that lining the interior walls of wicks (e.g., the composite wick design) improves the false-count rate by nearly a factor of 250 in a butanol-based system where machined plastic wicks were lined using the Nytran™ material as an inner wick. In one test that was run over a 12-hour period, the false-count rate for a single layer wick (i.e., without the inner liner) was 162 counts per hour. During a later 12-hour period conducted using the inner liner, the same wick exhibited only 0.667 false-counts per hour (i.e., approximately 0.01 false-counts per minute). Consequently, the composite wick described herein can readily be used with a variety of working fluids including, in addition to water, other common fluids such as butanol, alcohol, and others.

To verify the efficacy of the composite wick as compared with traditional single-material plastic wicks, additional tests were run on multiple water-based CPCs using only the plastic wicks. In one of the additional tests, the total false-particle count rate increased to nearly 14 counts per minute (840 counts per hour), at which point the test was terminated since the false-particle counts were continuously increasing. However, in all tests conducted, the water-based CPCs using only the plastic wicks exhibited counts well in excess (i.e., by orders or magnitude) of the six counts per hour at 2.83 lpm requirement for semiconductor cleanrooms.

The description above includes illustrative examples, devices, and apparatuses that embody the disclosed subject matter. In the description, for purposes of explanation, numerous specific details were set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed herein focus on particular composite wick designs incorporating specific materials, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other composite wick formation techniques and materials discussed herein.

Moreover, although specific values, ranges of values, dimensions, and techniques are given for various parameters discussed herein, these values and techniques are provided merely to aid the person of ordinary skill in the art in understanding certain characteristics of the designs and techniques disclosed herein. Those of ordinary skill in the art will realize, upon reading and understanding the disclosure provided, that these values, dimensions, and techniques are presented as examples only and numerous other values, ranges of values, dimensions, and techniques may be employed while still benefiting from the novel designs discussed that may be employed to produce a composite wick. Therefore, the various illustrations of the apparatus are intended to provide a general understanding of the structure and design of various embodiments and are not intended to provide a complete description of all the elements and features of the apparatus that might make use of the structures, features, and designs described herein.

Many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to a person of ordinary skill in the art from the foregoing descriptions. For example, although the disclosure provided herein is focused on a composite wick comprised of two materials strictly for ease in understanding the inventive subject matter, the skilled artisan will recognize that more than two materials may be used to form a composite wick. Portions and features of some embodiments may be included in, or substituted for, those of others. Many other embodiments will be apparent to those of ordinary skill in the art upon reading and understanding the description provided. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:
1. A composite wick apparatus, the apparatus comprising:
a wick holder having a tubular section and a conical section, the tubular section having a hole formed therein along a long axis of the tubular section, the tubular section and the conical section each being formed from at least one material that is impermeable to a working fluid;

a first porous material having a first pore density, the first porous material further having a first surface and an opposing second surface;

a second porous material in fluid communication with the first porous material and having a first surface with an area substantially the same as an area of the first surface of the first porous material, the first surface of the second porous material is substantially in contact with the first surface of the first porous material, the second porous material having a second pore density that is dissimilar to the first pore density, the first porous material and the second porous material are configured to provide vapor from the working fluid to a fluid-based particle counter, the first porous material and the second porous material configured to be placed within at least the tubular section of the wick holder.

2. The apparatus of claim 1, wherein the second porous material is concentric with the first porous material.

3. The apparatus of claim 1, wherein the opposing second surface of the first porous material is substantially in contact with an inner portion of the wick holder.

4. The apparatus of claim 1, wherein a longitudinal axis of the conical section is arranged along the long axis of the tubular section.

5. The apparatus of claim 1, wherein at least the second porous material extends partially into the conical section to enable condensed droplets of the working fluid to be absorbed by at least the second porous material.

6. The apparatus of claim 1, wherein the conical section has a surface texture on an inner surface of the conical section.

7. The apparatus of claim 1, wherein the conical section comprises a thermally-insulating material to provide a thermal barrier from the tubular section.

8. The apparatus of claim 1, wherein the first porous material comprises a sintered plastic material and the second porous material comprises a nylon membrane.

9. The apparatus of claim 1, wherein at least one of the first porous material and the second porous material comprise a hydrophilic material.

10. The apparatus of claim 1, wherein at least one of the first porous material and the second porous material comprise a hydrophobic material.

11. The apparatus of claim 1, wherein at least one of the first porous material and the second porous material comprise at least one material selected from materials including sintered metal and porous ceramic.

12. A composite wick apparatus, the apparatus comprising:

a first porous material layer having a first surface and an opposing second surface;

a second porous material layer in fluid communication with the first porous material layer, the second porous material layer having a first surface with an area substantially the same as an area of the first surface of the first porous material layer, the first surface of the second porous material layer being substantially in contact with the first surface of the first porous material layer and formed concentrically within the first porous material layer, the first porous material layer and the second porous material layer to provide vapor from a working fluid to a fluid-based particle counter, the first porous material and the second porous material configured to be placed within at least a tubular section of a wick holder, the tubular section having a hole formed therein along a long axis of the tubular section and formed from at least one material that is impervious to the working fluid.

13. The apparatus of claim 12, wherein the first porous material layer has a first pore density and the second porous material layer has a second pore density.

14. The apparatus of claim 12, wherein the first porous material layer has a first pore density and pore size distribution and the second porous material layer has a second pore density and pore size distribution, the first pore density and pore size distribution differs from the second pore density and pore size distribution.

15. The apparatus of claim 12, wherein at least one of the first porous material layer and the second porous material layer is substantially uniform in thickness.

16. The apparatus of claim 12, wherein at least one of the first porous material layer and the second porous material layer varies in thickness.

17. The apparatus of claim 12, wherein each of the first porous material layer and the second porous material layer comprise different materials.

18. The apparatus of claim 12, wherein each of the first porous material layer and the second porous material layer comprise the same material.

19. The apparatus of claim 12, wherein at least one of the first porous material layer and the second porous material layer have varying pore densities.

20. The apparatus of claim 12, wherein at least one of the first porous material layer and the second porous material layer have varying pore size distributions.

21. A wick apparatus comprising a plurality of porous material layers in fluid communication with and formed concentrically with one another, the plurality of porous material layers to provide vapor from a working fluid to a fluid-based particle counter, at least one of the plurality of porous material layers having median pore characteristic dimensions that are larger than median pore characteristic dimensions in at least some of remaining ones of the plurality of porous material layers, the plurality of porous material layers configured to be placed within at least a tubular section of a wick holder, the tubular section having a hole formed therein along a long axis of the tubular section and formed from at least one material that is impervious to the working fluid.

22. The wick apparatus of claim 21, wherein pore sizes in at least one of the plurality of porous material layers has a characteristic dimension of less than about one micron.

23. The wick apparatus of claim 21, wherein pore sizes in at least one of the plurality of porous material layers has a characteristic dimension of greater than about one micron.

24. The wick apparatus of claim 21, wherein at least one of the plurality of porous material layers includes a surfactant material.

25. The wick apparatus of claim 21, wherein each of the plurality of porous material layers comprise a similar material.

26. The wick apparatus of claim 21, wherein at least some of the plurality of porous material layers comprise materials dissimilar from remaining ones of the plurality of porous material layers.

27. The wick apparatus of claim 21, wherein each of the plurality of porous material layers is selected from at least one material selected from materials including fibers or fibrous materials, woven materials, non-woven materials, fabrics, and glass-fibers.

* * * * *

UNITED STATES PATENT AND TRADEMARK OFFICE
CERTIFICATE OF CORRECTION

PATENT NO. : 11,422,080 B2
APPLICATION NO. : 16/346064
DATED : August 23, 2022
INVENTOR(S) : Caldow et al.

It is certified that error appears in the above-identified patent and that said Letters Patent is hereby corrected as shown below:

On the Title Page

On page 2, in Column 1, Item (56) under "U.S. Patent Documents", Line 18, delete "2015/0001601" and insert --2015/0160105-- therefor In the Specification In Column 1, Line 65, alter "example", insert --,--

In Column 2, Line 59, delete "s non-toxic" and insert --is non-toxic,-- therefor In Column 3, Line 7, after "absorbance", insert --,--

In Column 3, Line 34, after "Typically", insert --,--

In Column 4, Line 50, after "artisan", insert --,--

In Column 5, Line 18, delete "Nytran™'" and insert --Nytran™-- therefor

In Column 5, Line 38, after "example", insert --,--

In Column 5, Line 54, after "shown", insert --,--

In Column 5, Line 55, after "rectangle", insert --,--

In Column 6, Line 36, after "materials", insert --,--

In Column 7, Line 29, after "rates", insert --,--

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,422,080 B2

In Column 7, Line 54, after "washed", insert --,--

In Column 8, Line 2, after "example", insert --,--